C. H. GARDINER.
DISK CULTIVATOR ATTACHMENT.
APPLICATION FILED JAN. 22, 1912.
1,045,137.
Patented Nov. 26, 1912.
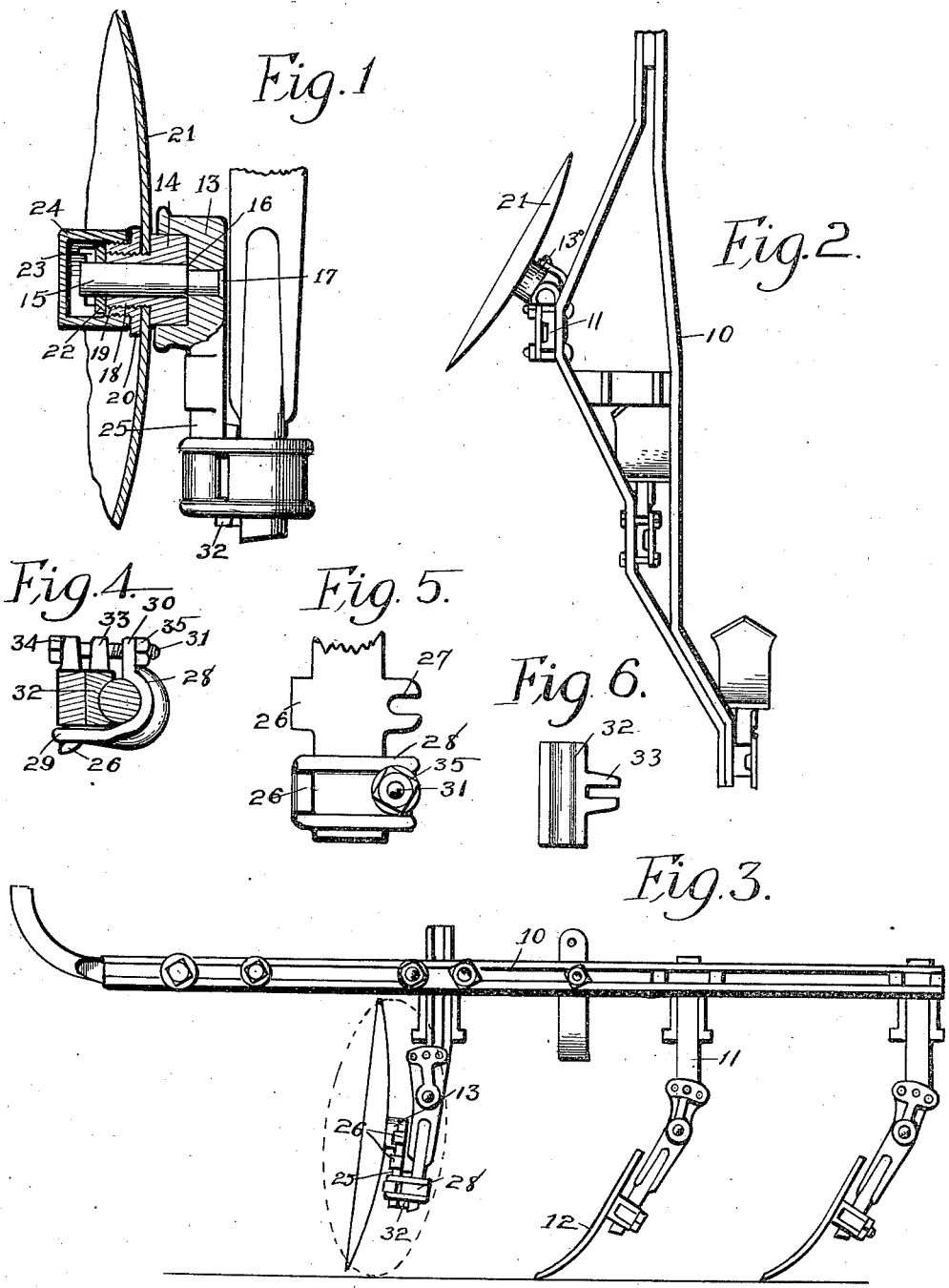

UNITED STATES PATENT OFFICE.

CHARLES H. GARDINER, OF BOUTON, IOWA.

DISK-CULTIVATOR ATTACHMENT.

1,045,137.  Specification of Letters Patent.  Patented Nov. 26, 1912.

Application filed January 22, 1912. Serial No. 672,783.

*To all whom it may concern:*

Be it known that I, CHARLES H. GARDINER, a citizen of the United States, residing at Bouton, in the county of Dallas and State of Iowa, have invented a certain new and useful Disk-Cultivator Attachment, of which the following is a specification.

The object of my invention is to provide a device of simple, durable and inexpensive construction designed to be used as an attachment that may be readily, quickly and easily applied to one of the shanks of an ordinary cultivator for the purpose of adjustably attached to the cultivator shank a large sized disk of the kind ordinarily used on farm implements for the purpose of enabling the operator to break up and pulverize the earth adjacent to a row of stalks to be cultivated and to move all of the pulverized fine earth to position surrounding the plants being cultivated to thereby form a ridge surrounding the plants of loose fine earth that will form a mulch for the roots of the plants.

More specifically it is my object to provide an attachment for disks whereby the disk may be adjustably connected at a point below its center to the shank of the cultivator arm so that a large disk may be employed for the purpose of moving the earth a considerable distance so that the cultivator disk need not run close to the plants being cultivated, but will throw the earth a considerable distance toward the plants so that the surface roots of the plants adjacent to the rows will not be disturbed or broken; and at the same time to provide means for clearing away the weeds between the rows being cultivated.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a detail view, partly in section, illustrating a part of a cultivator shank and a part of a disk connected thereto by means of my improvement. Fig. 2 shows a top or plan view of a cultivator beam having a disk connected therewith by means of my improved device, and in lieu of one of the cultivator shovels. Fig. 3 shows a side elevation of the cultivator beam with shovels thereon, and with a disk supported on one of the shanks by means of my improved attachment. In this view the dotted lines show the position that the disk would assume in use. The solid lines show the disk in edge view for the purpose of illustrating the construction and arrangement of my improved attachment. Fig. 4 shows an enlarged, detail, sectional view of the clamping device. Fig. 5 shows a side elevation of same, and Fig. 6 shows a detail view of the block in the clamping device.

Referring to the accompanying drawings, I have used the reference numeral 10 to indicate a cultivator beam of ordinary construction provided with a series of shanks 11 to which are attached the shovels 12. The shovels are detachably connected with the shanks in the manner now in common use.

For the purpose of attaching a cultivator disk to one of the shanks, I have provided an arm 13 having on one side a circular recess to receive a hub 14 and an axle 15 on which the hub is rotatably mounted. This axle has an annular shoulder at 16 to rest against the arm 13 and one end of the axle extends through the arm 13 and is upset at 17 to firmly fix it to the arm 13. The outer end of the hub 14 is provided with a screw threaded extension 18 on which is mounted a screw threaded sleeve 19 having a flange 20. The disk 21 which is of the ordinary construction is first placed on the hub and then the sleeve 19 is screwed in position on the hub to clamp the disk firmly between the flange 20 and the head of the hub. A washer 22 is placed on the end portion of the axle and is held by means of the key 23 which passes through the axle.

For the purpose of lubricating the hub, I have provided a screw cap 24 which screws on to the sleeve 19 and which is designed to contain hard oil. By this arrangement it is obvious that a rotatable support for the disk is provided which requires only a minimum of space between the disk and the adjacent part of the arm 13. The body portion 25 of the arm 13 extends downwardly and is provided with a series of lugs 26 on one edge and a series of slotted lugs 27 on the other edge. In Fig. 3 of the drawings there are three of the lugs 26 shown although any number may be employed.

For the purpose of detachably connecting the arm that supports the disk with the shank 11, I have provided a clamping device consisting of a clamping member 28 having its central portion shaped to fit around one side of the shank and one end provided with a loop 29 to engage one of the lugs 26 and its other end is provided with an extension 30 through which a bolt 31 may be passed. Between the arm and the clamping member 28 is a block 32 having one face concave to fit against the shank and provided on one side with a slotted lug 33 through which the bolt 31 may pass. The said bolt is provided with a head 34 on one end designed to engage one of the slotted lugs 27 on the arm and the other end is provided with a nut 35 to engage the part 31, as shown in Fig. 4.

On cultivator shanks of the kind in common use there is only a relatively small portion thereof in which a clamping device for a cultivator disk or shovel can be placed, and a clamping device for a disk applied direct to the shank so that the center of the disk would be adjacent to the part of the shank to which a clamp may be applied would necessitate the use of a disk of very small diameter which would not be suitable for the purposes for which my invention was intended. It is therefore essential in a device of this kind that the center of the cultivator disk be arranged at a considerable distance above the part of the shank to which a clamp may be applied. For this purpose, I have provided the downwardly extending arm and the clamping device at the lower portion thereof. Said clamping device is obviously so arranged that it is only necessary to loosen the nut 35 slightly to permit the device to be readily and quickly attached to or removed from the shank and when it is once in position it will firmly and securely support the cultivator disk.

It is my object also to provide means whereby my improved attachment can be applied to cultivator shanks of various sizes and shapes and for this reason I have provided means whereby the clamping device can be adjusted vertically on the arm by having the clamping device engaged in one of the series of lugs 26 and 27 on the arm.

In practical use, it is usually preferable, in the cultivation of plants such, for instance, as corn, to cultivate the earth by means of shovels which can stir the earth quite deep and which will not throw the earth on top of the plants. Then after the plants have attained a considerable growth and the root system of the plants is well developed, it is objectionable to use shovels for the reason that in order to run them close enough to the plants to pile the earth around the roots of the plants the shovels must run so deep that they will break up and tear apart the surface roots of the plants, thus effecting a considerable damage to the vitality of the plants.

One of the advantages of my improvement is that after the plants have attained a certain size the operator may then readily and quickly remove the front shovel and substitute therefor my improved disk attachment which may be so adjusted relative to the shank that a disk of very large size may be used that will run into the ground only to the desired depth which is preferably the same or less than the depth to which the shovels will run. Then in cultivating the plants the disk need not run very close to the plants for the reason that the large disk will scrape or move a large quantity of the surface earth laterally toward the row of growing plants and this will cause a ridge to be formed surrounding the plants of pulverized loose earth which will form a mulch for the plants and which will aid in conserving the moisture in the soil. It is only necessary to use a single disk on each cultivator beam for the reason that the remaining shovels on the beam do not run close to the row of plants and therefore they are useful in simply stirring up the soil and killing the weeds in the spaces between the rows. My attachment also permits the disk to be placed at any desired angle relative to the shank as may be required to produce the satisfactory results in cultivation.

I claim as my invention:

1. In a device of the class described, the combination of a frame, a cultivator disk, a hub on said disk, an axle on which said hub is rotatably mounted, a downwardly extending arm on said hub for supporting said axle, and a clamp capable of vertical adjustment on said arm and also capable of vertical adjustment on a cultivator shank.

2. The combination of a cultivator disk, of a hub fixed to the disk, an axle on which the hub is rotatably mounted, an arm for supporting said axle, said arm being extended downwardly and being provided with a number of clamp attaching means at its lower portion, a clamp capable of being adjustably secured to any of said clamp attaching means and also capable of being adjustably secured to a cultivator shank.

3. The combination with a cultivator disk, of a hub, an upright arm, an axle fixed to the arm and extended through the hub, said arm being provided on its edges below its upper portion with a series of lugs on one edge and a series of slotted lugs on the other edge, a clamp comprising a clamping member having an extension designed to receive one of said lugs, and also having another extension designed to receive a bolt, a block between the arm and the clamping member, said block being provided with a slotted extension to receive a bolt, and a bolt passed through one of the slotted extensions on the arm, the slotted extension on the block and also through the bolt receiving extension on the said clamping member, and a nut on said bolt, for the purposes stated.

Des Moines, Iowa, January 3, 1912.

CHARLES H. GARDINER.

Witnesses:
E. J. Drake,
J. R. Gardiner.

Copies of this patent may be obtained for five cents each, by addressing the "Commissioner of Patents, Washington, D. C."